(12) United States Patent
Choi

(10) Patent No.: US 9,734,057 B2
(45) Date of Patent: *Aug. 15, 2017

(54) SEMICONDUCTOR STORAGE DEVICE AND BUFFER OPERATION METHOD THEREOF

(71) Applicant: SAMSUNG ELECTRONICS CO., LTD., Suwon-si, Gyeonggi-Do (KR)

(72) Inventor: In-Hwan Choi, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,185

(22) Filed: Mar. 24, 2016

(65) Prior Publication Data

US 2016/0196208 A1    Jul. 7, 2016

Related U.S. Application Data

(63) Continuation of application No. 14/056,458, filed on Oct. 17, 2013, now Pat. No. 9,304,911.

(30) Foreign Application Priority Data

Dec. 5, 2012    (KR) .................. 10-2012-0140383

(51) Int. Cl.
*G06F 3/00* (2006.01)
*G06F 12/06* (2006.01)

(52) U.S. Cl.
CPC .. *G06F 12/0646* (2013.01); *G06F 2212/7203* (2013.01)

(58) Field of Classification Search
CPC ........................................... G06F 12/00
USPC ............................................. 710/1
See application file for complete search history.

(56) References Cited

U.S. PATENT DOCUMENTS

| | | | |
|---|---|---|---|
| 7,395,384 B2* | 7/2008 | Sinclair | G06F 12/0246 707/999.202 |
| 7,681,008 B2* | 3/2010 | Tomlin | G06F 12/023 711/170 |
| 2006/0153033 A1* | 7/2006 | Saito | G06F 3/0611 369/47.33 |
| 2010/0174860 A1* | 7/2010 | Kim | G06F 12/0246 711/112 |
| 2011/0082967 A1* | 4/2011 | Deshkar | G06F 12/0246 711/103 |
| 2014/0156964 A1 | 6/2014 | Choi | |

\* cited by examiner

*Primary Examiner* — Titus Wong
(74) *Attorney, Agent, or Firm* — F. Chau & Associates, LLC

(57) ABSTRACT

A method of operating a semiconductor storage device is provided. A memory space of a buffer memory is allocated into a data area for storing user data and a map area for storing map data. The user data and the map data are read from a nonvolatile memory. A size of the user data to be stored in the data are compared with a size of the data area. The size of the data area and the size of the map area are adaptively varied according to the comparison result.

19 Claims, 10 Drawing Sheets

SEMICONDUCTOR STORAGE DEVICE AND BUFFER OPERATION METHOD THEREOF

CROSS-REFERENCE TO RELATED APPLICATION

This application is a continuation of U.S. application Ser. No. 14/056,458 filed on Oct. 17, 2013 which claims priority under 35 U.S.C. §119 to Korean Patent Application No. 10-2012-0140383, filed on Dec. 5, 2012, in the Korean Intellectual Property Office, the disclosure of which is incorporated by reference herein in its entirety.

TECHNICAL FIELD

The present inventive concept relates to a semiconductor storage device and a buffer operation method thereof.

DISCUSSION OF RELATED ART

Since flash memory devices are nonvolatile, they are used as a computer memory, a solid state drive (SSD), a memory card, etc. A controller is used to control flash memory devices. The controller may employ a data area and mapping information to more effectively control semiconductor storage devices.

SUMMARY

According to an exemplary embodiment of the inventive concept, a method of operating a semiconductor storage device is provided. A memory space of a buffer memory is allocated into a data area for storing user data and a map area for storing map data. The user data and the map data are read from a nonvolatile memory. A size of the user data to be stored in the data are compared with a size of the data area. The size of the data area and the size of the map area are adaptively varied according to the comparison result.

According to an exemplary embodiment of the inventive concept, a semiconductor storage device includes a nonvolatile memory and a controller. The controller includes a buffer memory having a data area and a map area. The controller is coupled to the nonvolatile memory. The controller is configured to temporarily store user data and map data read from the nonvolatile memory in the data area and the map area of the buffer memory. The controller is configured to compare a size of the user data to be stored in the buffer with a size of the data area. The controller adaptively varies the data area and the map area according to the comparison result.

According to an exemplary embodiment of the inventive concept, a memory controller for operating a nonvolatile memory includes a buffer memory and a buffer memory controller. The buffer memory is configured to have a predetermined size of a memory space. The memory space is divided into a data area having a first size and a map area having a second size. The buffer memory controller is configured to vary the first size of the data area and the second size of the map area according to a read operation mode of the memory controller. A sum of the first size and the second size is constant.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF THE EMBODIMENTS

Figure 1:
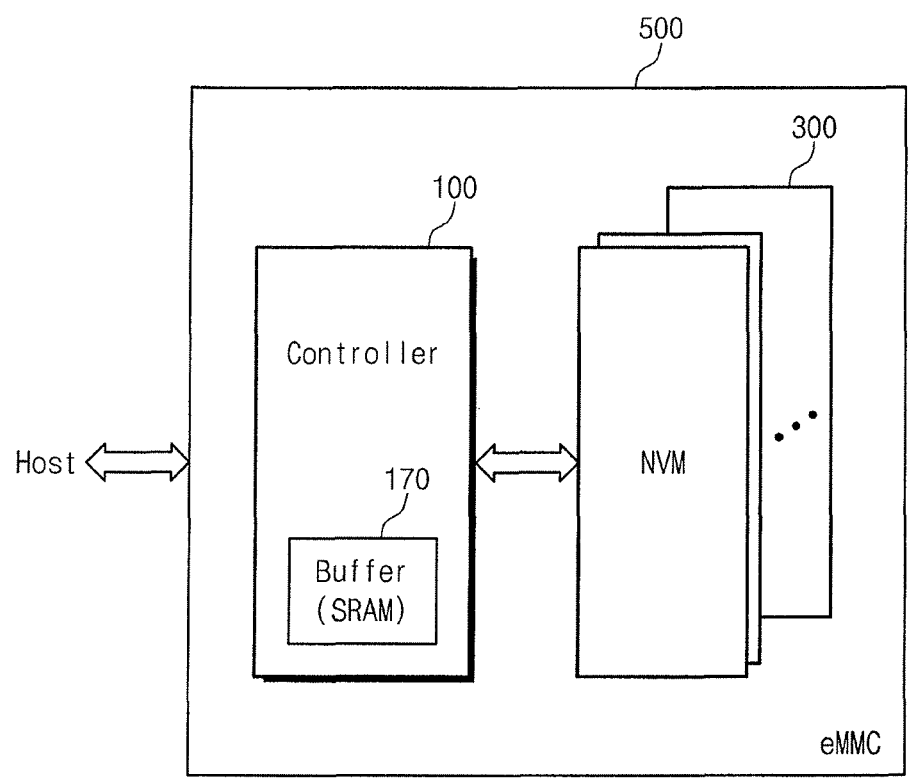
FIG. 1 is a block diagram of a semiconductor storage device according to an exemplary embodiment of the inventive concept.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when a layer is referred to as being "on" another layer or substrate, it may be directly on the other layer or substrate, or intervening layers may also be present. Like reference numerals may refer to the like elements throughout the specification and drawings.

FIG. 1 is a block diagram of a semiconductor storage device according to an exemplary embodiment of the inventive concept.

Referring to FIG. 1, a semiconductor storage device 500 includes a controller 100 and a nonvolatile semiconductor memory (NVM) 300 as a data storage.

The controller 100 includes a buffer memory 170 for storing map information and user data by performing a map loading operation and a data loading operation. The buffer memory 170 may include a static random access memory (SRAM).

In the case where a semiconductor storage device does not include a dynamic random access memory (DRAM) like an eMMC (Embedded MultiMedia Card) for storing map information and user data, the buffer memory 170 may have a limited data storage capacity. Thus, only part of the whole map information stored in the NVM 300 may be loaded in the buffer memory 170.

As described later, the buffer memory 170 includes a memory space allocated into a map area for storing the map information and a data area for storing the user data. Since the buffer memory 170 is used for both the map area and the data area, the map area may have a limited size in the buffer memory 170 and thus a map hit ratio may become low according to a spatial locality of physical addresses for a read operation. For example, when a read operation is performed within a relatively narrow address space of a nonvolatile memory, more map information needs to be stored in the buffer memory 170 to have a sufficient map hit ratio. When the map area has a fixed size of the map area, map hit ratio may be decreased. In the case that storage areas of the buffer memory 170 are statically separated, it may be difficult to efficiently use a buffer memory having a limited storage capacity.

In an exemplary embodiment according to an inventive concept, in a buffer operation, the controller 100 may dynamically allocate the memory space of the buffer memory 170 dynamically to increase a map hit ratio. The controller 100 of the semiconductor storage device 500 includes the buffer memory 170 to store user data transferred from the NVM 300. A map area of the buffer memory 170 may be increased or decreased according to a data usage rate of the buffer memory 170.

The map information may be referred to as map data. The map data include address translation information between a logical address of a host and a physical address of a nonvolatile memory device. For example, map information may be stored in the NVM 300 and the memory controller 100 may store part of the map information in the buffer memory 170 to access the NVM 300.

The controller 100 may exchange data with a host using an interface protocol including a universal serial bus (USB), a multimedia card (MMC) interface, a PCI express interface, a serial ATA, a parallel ATA, a small computer system interface (SCSI), a serial attached SCSI (SAS) interface, an enhanced small disk interface (ESDI) or an integrated drive electronics (IDE) interface.

The controller 100 controls a write/read operation of the NVM 300 in response to a command input from the host.

The NVM 300 may serve to store user data having various types of data such as a text, a graphic image, a software core information, etc. The NVM 300 may include a NAND flash memory, a NOR flash memory, a phase change memory device (PRAM), a ferroelectric memory device (FeRAM), or a magnetic resistance RAM (MRAM). However, the NVM 300 for storing user data is not limited thereto.

Figure 2:
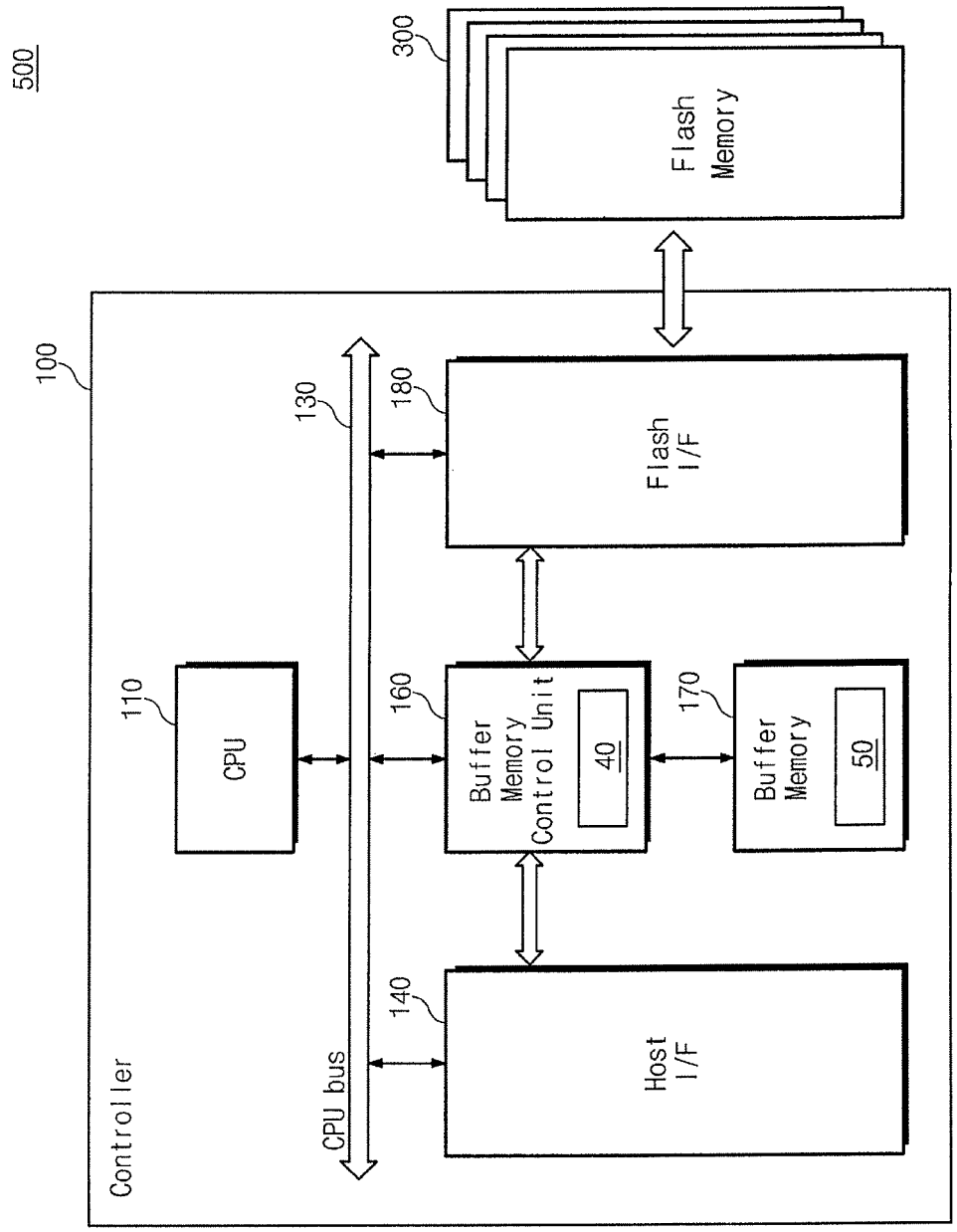
FIG. 2 is a specific block diagram of FIG. 1 according to an exemplary embodiment of the inventive concept.

FIG. 2 is a specific block diagram illustrating the controller 100 of FIG. 1 according to an exemplary embodiment of the inventive concept.

Referring to FIG. 2, the controller 100 includes a central processing unit (CPU) 110, a CPU bus 130, a host interface 140, a buffer memory controller 160, a buffer memory 170 and a flash memory interface 180.

The central processing unit (CPU) 110, the host interface 140, the buffer memory controller 160, the buffer memory 170 and the flash interface 180 are connected to one another through the CPU bus 130.

To temporarily store user data and map data read from a NVM 300, the buffer memory 170 may include a data area and a map area internally assigned or allocated for the user data and the map data. The user data and the map data may be stored in the data area and the map area of the buffer memory 170 respectively.

The CPU 110 controls an overall operation of the controller 100. Using the host interface 140, a command, an address, and data are exchanged with a host according to a control of the CPU 110. Data input from the host through the host interface 140 or data to be transmitted to the host is temporarily stored in the data area of the buffer memory 170 and then is transmitted to the flash memory 300 or the host.

The buffer memory control unit 160 controls an access operation (e.g., read, write and erase operations) of the buffer memory 170 in response to a control of the CPU 110. The buffer memory control unit 160 may include a masking part 40 selectively masking (i.e., selectively not transmitting) a part of data being provided from the flash memory 300. The masking part 40 may include a DQ input/output mask circuit. To perform a data masking operation, the masking part 40 may include a circuit generating a masking clock signal according to a data value set in a register and a counter determining a sector address of the buffer memory 170 to be masked (or excluded from the masking). The data masking operation of the masking part 40 is performed by a control of a random access control unit 50 of the buffer memory 170.

The buffer memory control unit 160 compares a size of user data to be stored in the buffer memory 170 from the NVM 300 with a size of a user data to be transmitted from the buffer memory 170 to the host. In an exemplary embodiment, the size of the user data to be transmitted from the buffer memory 170 to the host may amount to a size of the data area previously assigned by the buffer memory control unit 160. When the size of user data to be stored in the buffer memory 170 from NVM 300 is greater than that of the data area DA, the buffer memory control unit 160 may increase the size of the data area DA. The buffer memory control unit 160 adaptively varies a size of the data area of the buffer memory 170 according to the comparison result.

In the case that a size of the user data to be transmitted from the buffer memory 170 to the host is greater than a size of the user data to be stored in the buffer memory 170 from the flash memory 300, a size of the data area of the buffer memory 170 is reduced but a size of the map area of the buffer memory 170 increases.

In the case that a size of the data area is smaller than a size of the user data to be stored in the buffer memory 170 from the NVM 300, a size of the data area of the buffer memory 170 increases and thus a size of the map area of the buffer memory 170 is reduced by the increased size of the data area.

The data area of the buffer memory 170 may increase in size when a sequential read operation is performed. The map area of the buffer memory 170 may increase in size when a random read operation is performed.

In the case that a size of the data area of the buffer memory 170 is reduced, a size of the map area of the buffer memory 170 may increase by the decreased size of the data area. When a size of the data area of the buffer memory 170 increases, a size of the map area of the buffer memory 170 may be reduced by the increased size of the data area.

The buffer memory 170 may include a SRAM having a fixed storage capacity previously set.

An increase of the data area of the buffer memory 170 may occur when user data having a relatively large size moves in a relatively narrow address space and an increase of the map area of the buffer memory 170 may occur when user data having a relatively small size moves in a relatively wide address space. Thus, a relative size of the data area and the map area of the buffer memory 170 may be changed in real time depending on whether a mode of a read operation required by the host is a sequential read operation or a random read operation.

To increase a map hit ratio, a size of the map area of the buffer memory 170 has to increase.

The buffer memory 170 may have a function of temporarily storing data being transmitted between the NVM 300 and the host and a function of storing a software program needed when performing a FTL (Flash Translation Layer) function and programs to be operated by the CPU 110. The buffer memory 170 may store part of address mapping information of the NVM 300 processed by FTL.

In an exemplary embodiment of the inventive concept, the map area of the buffer memory 170 may be changed depending on a data usage rate of the buffer memory 170.

The FTL may operate as the random access control unit 50 controlling a random access of the flash memory 300. Functions performed by the FTL will be described below.

The buffer memory 170 may include a nonvolatile memory (e.g., SRAM) and may be configured to have a storage capacity corresponding to a page size or plurality of page sizes of the NVM 300. Address mapping information may be stored in a map area (e.g., a meta area) of the NVM 300. Address mapping information stored in the flash memory 300 may be loaded in the map area of the buffer memory 170 as part of a power-up operation when the semiconductor storage device 500 is turned on. Map data such as the map information may be all stored in the flash memory 300. Part of map data such as the map information may be stored in the buffer memory 170. A software program needed when performing the FTL function may be stored in the NVM 300. For example, the software program may be stored in a data storage region (e.g., a boot code region) of the NVM 300. The software program may be loaded in the buffer memory 170 when a power-up operation is performed.

In the NVM 300, an overwrite operation needs to perform an erase operation in advance. A unit of data to be written in the NVM 300 (which is referred to as a "page") is smaller than a unit of data to be erased in the flash memory 300 (which is referred to as a "block"). Due to this discrepancy, the NVM 300 is inappropriate as a main memory. In addition, when the NVM 300 is used as an auxiliary memory device such as a hard disk, such discrepancy does not match a general file system for the auxiliary memory device. Thus, to map logical addresses of the file system to their physical addresses within the NVM 300, the FTL may be used between the file system (not shown, the file system is generally stored in the host in a software form) and the NVM 300.

In a write operation, the FTL performs an address mapping function of mapping a logical block address (LBA) generated by the file system to its corresponding physical block address of the NVM 300. An erase operation is performed on the corresponding physical block address of the NVM 300. In addition, the NVM 30, using the corresponding physical block address, performs various operations including a function of a bad block management, a data preservation management caused by an unexpected power off, a wear-leveling management, etc. Using the FTL, the file system may randomly access the NVM 300. The random access control unit 50 of the buffer memory 170 may controls a random data access operation with respect to the NVM 300 in response to a random access command input from the host.

The random access operation is divided into a data masking method and a sector bitmap method.

In the case of the data masking method, the FTL controls an operation of the masking part 40 of the buffer memory control unit 160 to selectively mask part of data read from the NVM 300. As a result, a plurality of random data may be selectively provided to the buffer memory 170 with respect to the random access command from the host.

In the case of the sector bitmap method, the FTL automatically generates addresses of sectors to be randomly accessed using a value stored in a register. An address of the plurality of random data may be continuously generated with respect to the random access command from the host. Sectors to be randomly accessed may be set in a register as needed.

A random data access may be performed only in a designated sector according to the value stored in the register. As a result, an optimal random data access is possible without waste. A random access operation of the sector bitmap method may be bidirectionally applied between the flash memory 300 and the buffer memory 170 and may be applied to a modified copy back operation of the NVM 300.

The flash memory interface 180 exchanges data with the NVM 300 being used as information storage medium using a plurality of channels. A plurality of flash memories may be electrically connected to each channel. The same kind of flash memories may be connected to one channel. Different or same kind of flash memories may be connected to different channels. A flash memory connected to each channel may include a NOR flash memory, a NAND flash memory, a One-NAND flash memory, a single-level flash memory or a multi-level flash memory.

A register (not shown) is included in the flash memory interface 180 and may be used to designate data to be randomly accessed from the flash memory 300. A function of designating data to be randomly accessed in a register may be controlled by the FTL which operates as the random access control unit 50. A register included in the flash interface 180 or a register included in the buffer memory control unit 160 may be used as a register to be used in a random access operation.

In FIG. 2, the NVM 300 of FIG. 1 includes a flash memory but the inventive concept is not limited thereto.

Figure 3:
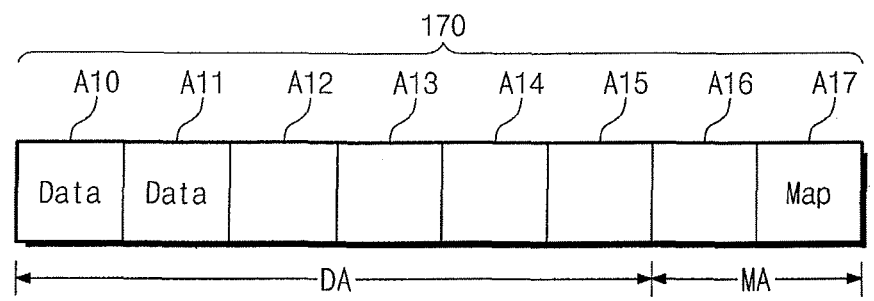
FIG. 3 shows a dynamic application of a buffer memory of FIG. 1 according to an exemplary embodiment of the inventive concept.
Figure 4:
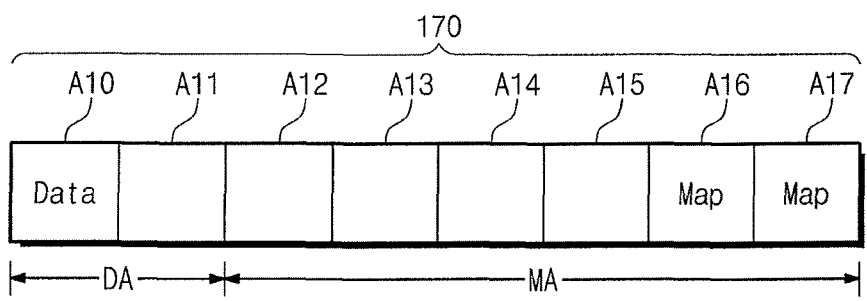
FIG. 4 shows a dynamic application of a buffer memory of FIG. 1 according to an exemplary embodiment of the inventive concept.

FIGS. 3 and 4 show a buffer memory having different memory allocation of a memory space of the buffer memory according to an exemplary embodiment of the inventive concept.

Referring to FIG. 3, the buffer memory 170 including a SRAM device includes storage areas A10, A11, A12, A13, A14, A15, A16, and A17. The buffer memory 170 may have a memory space of a limited size. In FIG. 3, the storage areas A10 through A15 are used as a data area DA in which user data is stored. The storage areas A16 and A17 of the buffer memory 170 are used as a map area MA in which map data is stored.

Referring to FIG. 3, the memory space of the buffer memory is allocated so that the data area DA has more memory space than the map area MA. The increase of the data area DA may occur by assigning part of the map area MA to the data area DA. For example, when a size of user data to be stored in the buffer memory from the nonvolatile memory is greater than a size of the data area DA, part of the map area MA is assigned to the data area DA to temporarily store the user data. Accordingly, the map area MA of the buffer memory 170 decreases in size and the data area DA of the buffer memory 170 increases as much as the map area MA decreases. An increase of the data area DA of the buffer memory 170 may be more adaptively performed when a sequential read operation is performed. For example, when a sequential read operation reads user data whose size is larger than the size of the data area DA, the data area DA increases by assigning part of the map area to the data area DA. An increase of the data area DA of the buffer memory 170 may occur when a relatively large quantity of data stored in a relatively narrow address space of the NVM 300. In this case, map information for accessing the NVM 300 occupies relatively small memory space of the buffer memory 170, and thus more memory space of the buffer memory 170 may be assigned to the data area DA.

Referring to FIG. 4, the memory space of the buffer memory 170 is allocated so that the map area MA has more memory space than the data area DA. The increase of the map area MA may occur by assigning part of the data area DA to the map area MA. For example, when the map area MA needs to more map information than what the map area MA may store, part of the data area DA is assigned to the map area MA to temporarily store more map information. Accordingly, the map area MA of the buffer memory 170 increases in size, and the data area DA decreases as much as the map area MA increases. An increase of the map area MA of the buffer memory 170 may be more adaptively performed when a random read operation is performed. An increase of the map area MA of the buffer memory 170 may occur when a relatively small quantity of data is stored in a relatively wide address space of the NVM 300. In this case, map information for accessing the NVM 300 occupies relatively large memory space of the buffer memory 170, and thus more memory space of the buffer memory 170 may be assigned to the map area DA.

As shown in FIG. 3 and FIG. 4, an interface between the data area DA and map area MA of the buffer memory 170 is changed in real time depending on a read operation mode including a sequential read operation and a random read operation.

Figure 5:
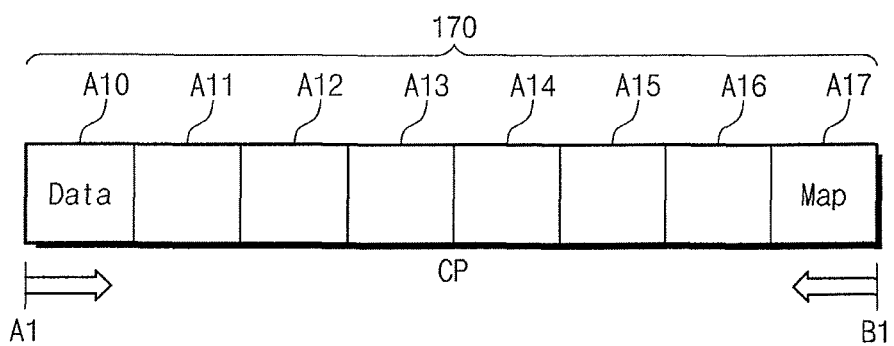
FIG. 5 show an initial state of a dynamic application of a buffer memory of FIG. 1 according to an exemplary embodiment of the inventive concept.
Figure 6:
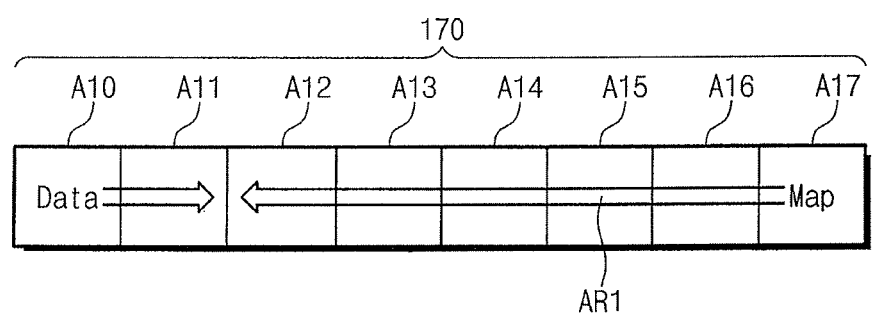
FIG. 6 shows a map area extension of a buffer memory of FIG. 1 according to an exemplary embodiment of the inventive concept.
Figure 7:
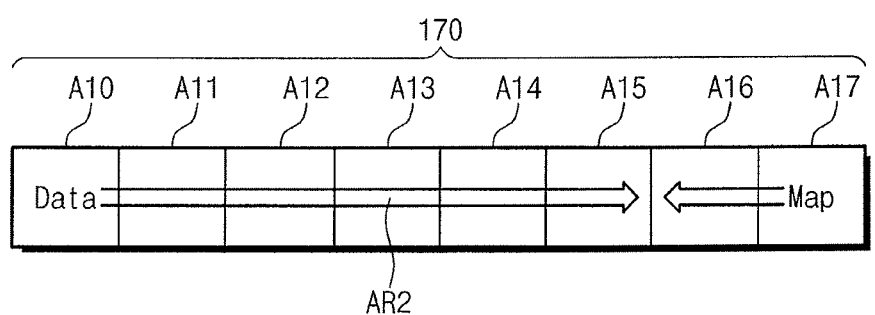
FIG. 7 shows a data area extension of a buffer memory of FIG. 1 according to an exemplary embodiment of the inventive concept.

FIGS. 5, 6, and 7 show how a memory space of a buffer memory is dynamically allocated for a data area and a map area. To dynamically allocate the memory space into a data area DA and a map area MA, the data area DA occupies at one end of the memory space and the map area MA occupies at the other end of the memory space.

Referring to FIG. 5, at an initial state, the data area DA begins to be stored from a beginning point A1 and expands toward a center point CP. The map area MA begins to be stored or filled from a beginning point B1 and expand toward the center point CP. In FIG. 5, the user data may begin to be stored upwardly from the beginning point A corresponding to the least significant bit address of the buffer memory 170 and the map data may begin to be stored downwardly from the beginning point B1 corresponding to the most significant bit address of the buffer memory 170.

Referring to FIG. 6, the map area MA is relatively more extended as compared with the data area. In the case that a random read operation is more frequently performed than a sequential read operation, the map area MA may be extended beyond the center point CP of FIG. 5 like an arrow sign AR1. Accordingly, a buffer operation is performed as shown in FIG. 4. In this case, a size of the data area of the buffer memory is reduced. In the case that the map area of the buffer memory extends, a storage size for map information increases and thereby a map hit ratio is increased.

Referring to FIG. 7, the data area DA is relatively more extended as compared with the map area MA.

In the case of FIG. 7, a sequential read operation is more frequently performed than a random read operation and thereby the data area extends beyond the center point CP of FIG. 5 like an arrow sign AR2. Accordingly, a buffer operation is performed as shown in FIG. 3. In this case, a size of the map area of the buffer memory is reduced. In the case that the data area of the buffer memory extends, a storage size of data increases.

Figure 8:
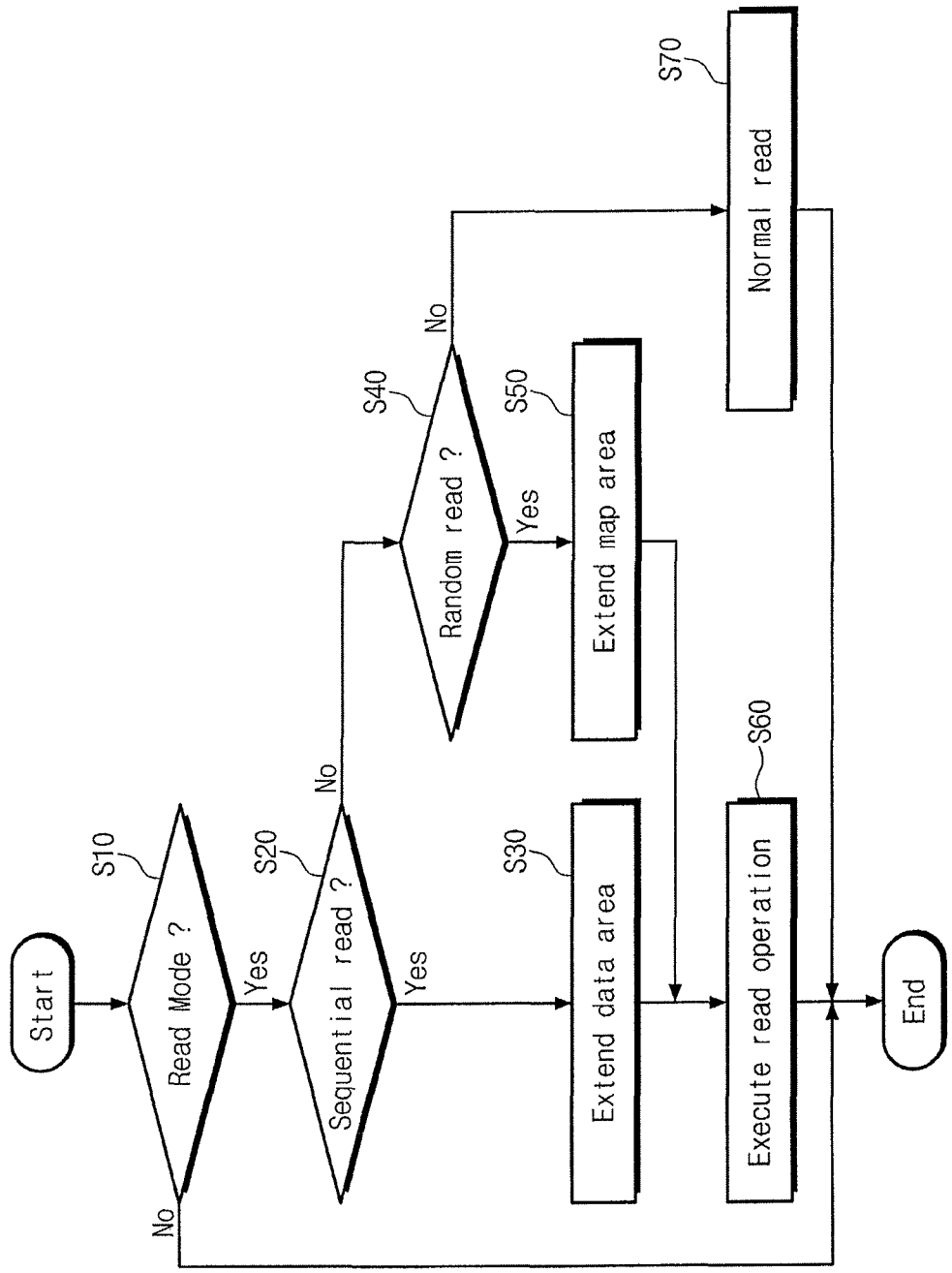
FIG. 8 is a flow chart illustrating a buffer operation according to an exemplary embodiment of the inventive concept.

FIG. 8 is a flow chart illustrating a buffer operation according to an exemplary embodiment of the inventive concept.

The control flow of FIG. 8 is performed by the controller 100 of FIG. 1 and may be controlled by the CPU 110 or buffer memory control unit 160 of FIG. 2.

Referring to FIG. 8, in step S10, it is checked whether the semiconductor storage device 500 enters a read operation mode. In the read operation mode, a map loading operation and a data loading operation may be performed. The controller 100, in step S20, checks whether the read operation mode entered is in a sequential operation mode.

In S30, when the read operation mode entered is the sequential operation mode, a data area is extended. In the step S30, a buffer operation is performed as shown in FIG. 7.

In S40, when the read operation mode entered is not the sequential operation mode, it is further checked whether the read operation mode entered is a random operation mode. When the read operation mode entered is the random operation mode, the map area is extended in S50. In step S50, a buffer operation is performed as shown in FIG. 6. Accordingly, a memory space of a buffer memory is allocated in step S30 or step S50 according to a read operation mode, and a corresponding read operation is performed in step S60 using the buffer memory having a memory space allocated in step S30 or step S50.

In the case that the map area stores more map information, a map hit ratio increases accordingly. Thus, the semiconductor storage device 500 may have an increased operation performance. Since the memory space of the buffer memory are dynamically allocated according to a read operation mode including the sequential read mode or the random read mode, the buffer memory 170 having a limited memory space may be efficiently used.

Figure 9:
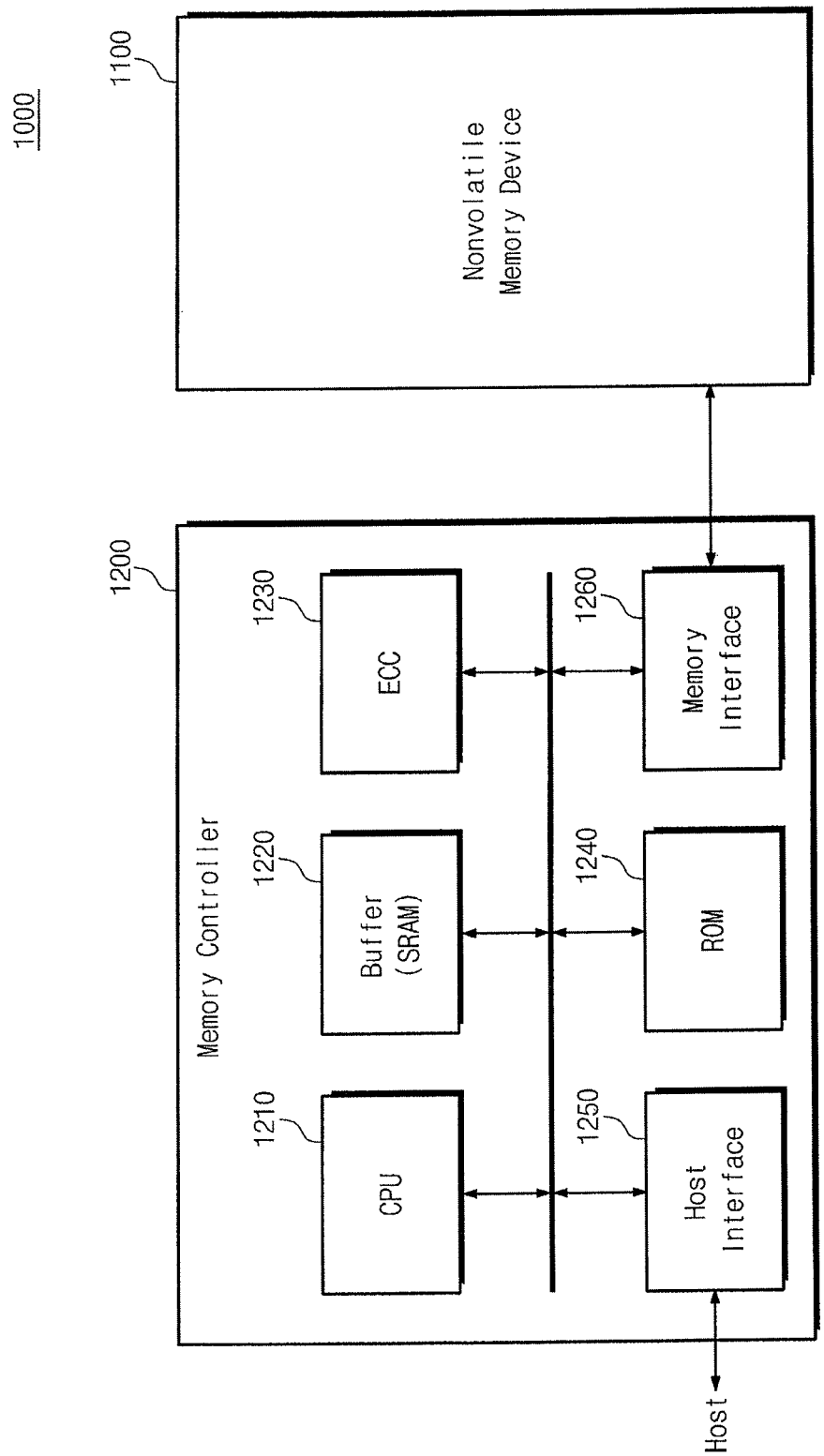
FIG. 9 is a block diagram of a memory system including a semiconductor storage device according to an exemplary embodiment of the inventive concept.

FIG. 9 is a block diagram illustrating a memory system according to an exemplary embodiment of the inventive concept. Referring to FIG. 9, the memory system 1000 includes a nonvolatile memory device (NVM) 1100 and a memory controller 1200. The NVM 1100 may include a NVM substantially similar, in configuration and operation, to the NVM 300 illustrated in FIG. 1.

In the case that a buffer memory 1220 includes a map area extended to store more map information, a map hit ratio increases. Since a memory space of the buffer memory 1220 is dynamically allocated into a map area and a data area according to a read mode including a sequential read mode or a random read mode, the buffer memory 1220 is efficiently used. The use efficiency of the buffer memory 1220 having a limited memory space is optimized.

The memory controller 1200 may control the NVM 1100 in response to an external request from a host. The memory controller may compress data being provided from the outside to store the compressed data in the NVM 1100. Using a data compression method, the NVM 110 store a large quantity of data at a low cost. The data compression method also reduces data traffic of a bus connected between the nonvolatile memory device 1100 and the memory controller 1200.

In the case that the buffer memory 1220 includes a semiconductor storage device having a small-capacity memory, only requested meta data among the whole meta data stored in the NVM 1100 may be loaded in the buffer memory 1220. For example, due to a memory space limitation of the buffer memory 1220, the meta data previously loaded is unloaded to load new meta data being currently loaded from the NVM 110.

The meta data included in the map information is data necessary to operate the NVM 1100. For example, the meta data may include name of file data, name of directory related to the file data, file data access authority and visual information. The meta data may also include state information about an block and page area available in the NVM 1100.

Figure 10:
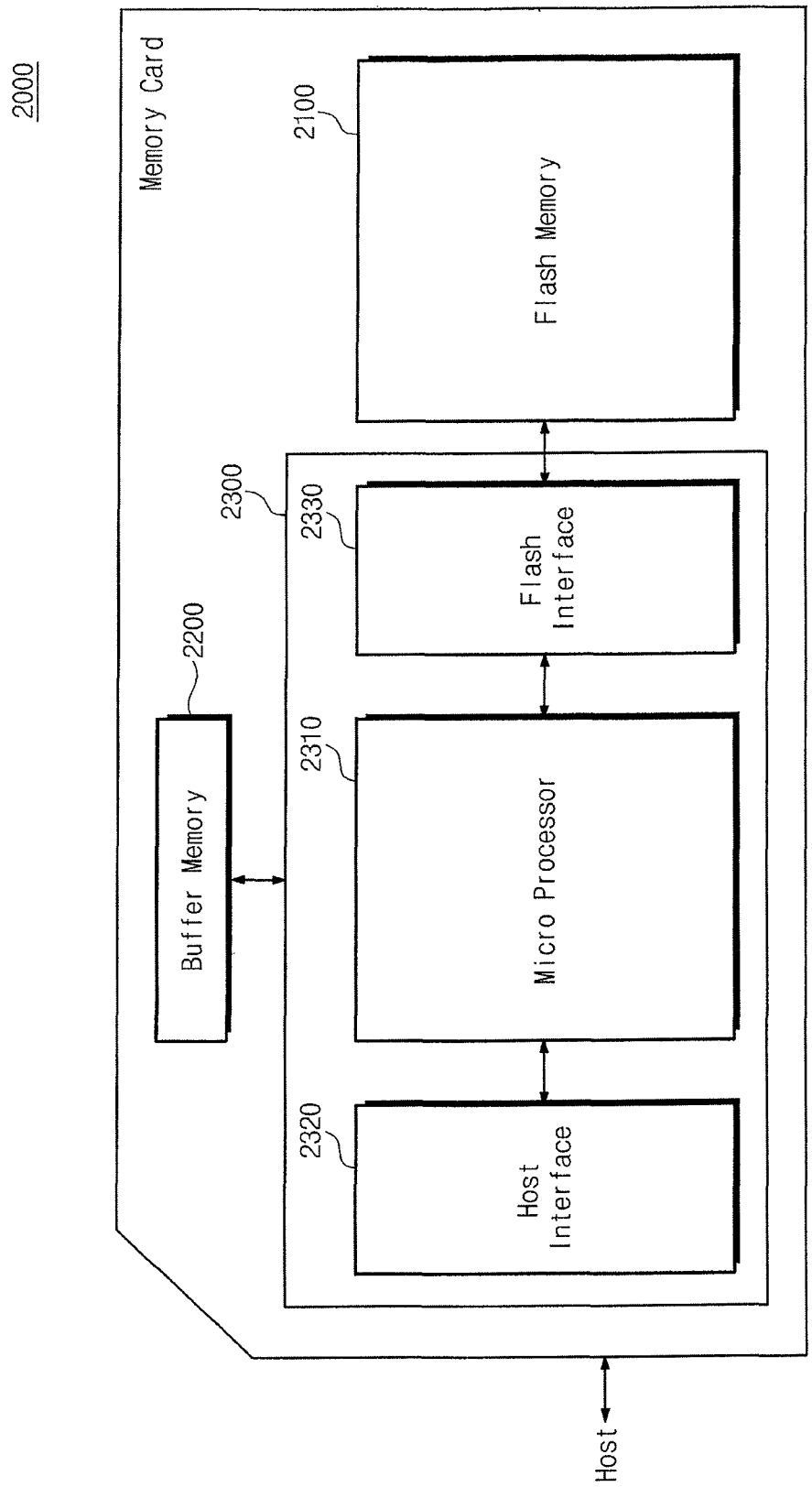
FIG. 10 is a block diagram of a memory card including a semiconductor storage device according to an exemplary embodiment of the inventive concept.

FIG. 10 is a block diagram of a memory card according to an exemplary embodiment of the inventive concept. Referring to FIG. 10, the memory card 2000 includes a flash memory device 2100, a buffer memory 2200 and a memory controller 2300 controlling the flash memory device 2100 and the buffer memory 2200. The flash memory device 2100 may include a nonvolatile memory substantially similar, in configuration and operation, to the NVM 300 illustrated in FIG. 1.

The buffer memory 2200 temporarily stores user data and map information for an operation of the memory card 2000. The buffer memory 2200 may include a SRAM.

In the case that the buffer memory 2200 includes a map area extended to store more map information, a map hit ratio increases. Since a memory space of the buffer memory 2200 is dynamically allocated into a map area and a data area according to a read operation mode including a sequential read mode or a random read mode, the buffer memory 2200 is efficiently used. The use efficiency of the buffer memory 2220 having a limited memory space is optimized.

The memory controller 2300 is connected between a host and the flash memory 2100.

In response to a request of the host, the memory controller 2300 accesses the flash memory device 2100. The memory controller 2300 includes a microprocessor 2310, a host interface 2320 and a flash interface 2330.

The microprocessor 2310 is configured to operate a firmware. The host interface 2320 interfaces with the host using a card protocol for performing a data exchange between the host and the flash interface 2330. The memory card 2000 include a multimedia card (MMC), a security digital (SD), a miniSD, a memory stick, a SmartMedia, or a TransFlash card.

The inventive concept may be applied to a solid state drive (SSD).

Figure 11:
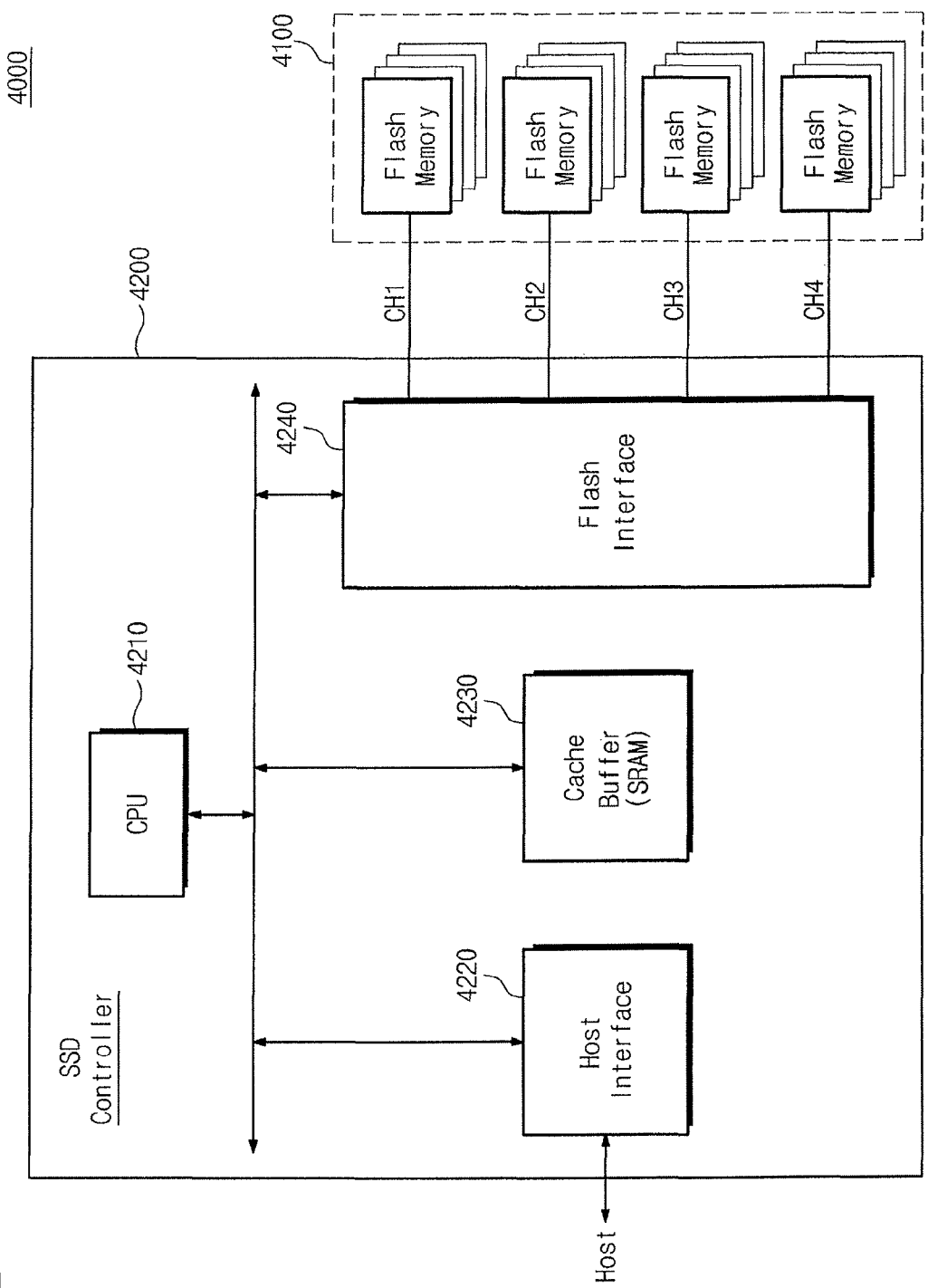
FIG. 11 is a block diagram of a SSD including a semiconductor storage device according to an exemplary embodiment of the inventive concept.

FIG. 11 is a block diagram of a SSD incorporating a semiconductor storage device according to an exemplary embodiment of the inventive concept. Referring to FIG. 11, the SSD 4000 includes a plurality of flash memory devices 4100 and a SSD controller 4200.

The flash memory device 4100 may include a nonvolatile memory substantially similar, in configuration and operation, to the NVM 300 illustrated in FIG. 1.

The SDD controller 4200 controls a plurality of flash memory devices 4100. The SSD controller 4200 includes a central processing unit (CPU) 4210, a host interface 4220, a cache buffer 4230 and a flash interface 4240. The host interface 4220 may exchange data with a host using an ATA protocol according to a control of the central processing unit (CPU) 4210. The host interface 4220 may include a serial advanced technology attachment (SATA) interface, a parallel advanced technology attachment (PATA) interface, or an external SATA interface. Data being input from the host through the host interface 4220 or data which has to be transmitted to the host is transmitted through the cache buffer 4230 not using a CPU bus according to a control of the central processing unit (CPU) 4210.

The cache buffer 4230 temporarily stores mobile data between the outside and the flash memory devices 4100. The cache buffer 4230 is used to store a program to be operated by the central processing unit (CPU) 4210. The cache buffer 4230 may serve as the buffer memory described above. The cache buffer 4230 may include a SRAM. In FIG. 10, the cache buffer 4230 is included in the SSD controller 4200 but the inventive concept is not limited thereto. Alternatively, the cache buffer may be disposed outside the SSD controller 4200.

In the case that the cache buffer 4230 stores more map information in the map area, a map hit ratio increases. Since the memory space of the cache buffer 4230 is dynamically allocated according to a read operation mode including the sequential read mode or the random read mode, the cache buffer 4230 having a limited memory space may be efficiently used.

The flash interface 4240 performs an interface between the flash memory device 4100 used as a storage device and the SSD controller 4200. The flash interface 4240 is configured to support a NAND flash memory, an One-NAND flash memory, a multilevel flash memory and a single level flash memory. The One-NAND flash memory may include a flash memory core and a memory control logic in a single chip.

Each of the flash memory devices 4100 may include single-level flash memory cells in which 1 bit data per cell is stored or multi-level flash memory cells in which a plurality of bits per cell is stored. The type of memory cell of a flash memory device 4100 may include a NAND flash memory, a NOR flash memory, an One-NAND flash memory or a combination thereof. The flash memory device 4100 may include a charge storage layer in various structures and materials. For example, the charge storage layer may include polycrystalline silicon having conductivity or an insulating layer such as $Si_3N_4$, $Al_2O_3$, HfAlO, HfSiO, etc. A flash memory having an insulating layer such as $Si_3N_4$, $Al_2O_3$, HfAlO, HfSiO, etc. as a storage layer is called a charge trap flash (CTF) memory.

Figure 12:
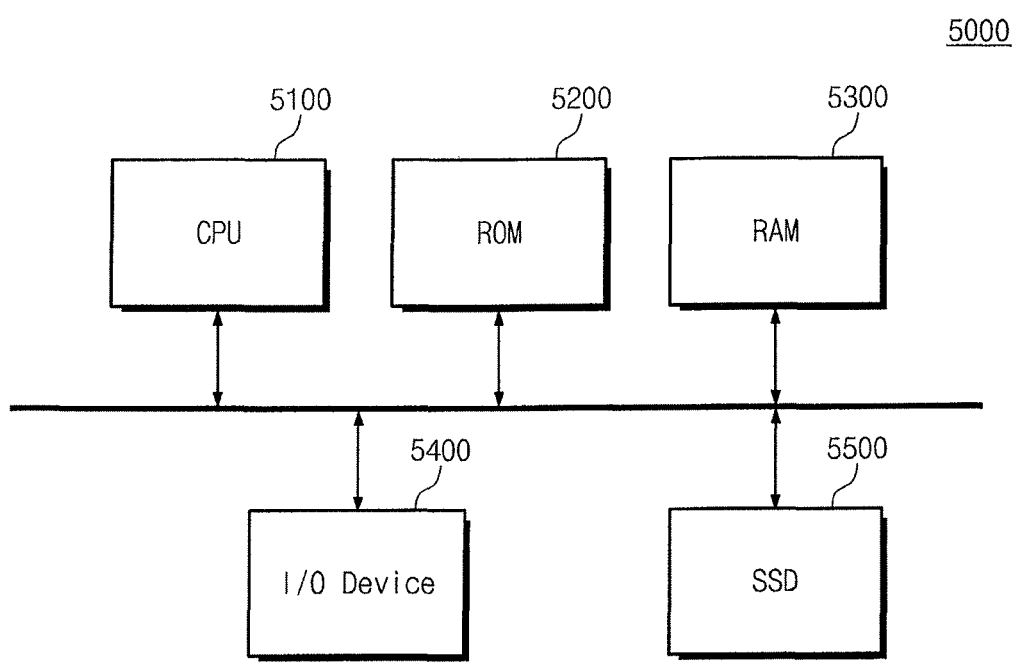
FIG. 12 is a block diagram illustrating a computing system including a SSD according to an exemplary embodiment of the inventive concept.

FIG. 12 is a block diagram illustrating a computing system including the SSD 4000 of FIG. 11 according to an exemplary embodiment of the inventive concept.

Referring to FIG. 12, the computing system 5000 includes a central processing unit (CPU) 5100, a ROM (Read Only Memory) 5200, a RAM (Random Access Memory) 5300, an input/output device 5400 and an SSD 5500. The central processing unit (CPU) 5100 is connected to a system bus. The ROM 5200 stores data needed to operate the computing system 5000. The data may include information about a command sequence for booting up the computing system 5000 or a basic input/output operation system (BIOS) information. The RAM 5300 temporarily stores data being generated when the central processing unit (CPU) 5100 is executed. The input/output device 5400, such as a keyboard, a pointing device (mouse), a monitor, a modem, etc. is connected to the system bus through an input/output device interface.

Although not illustrated in the drawing, an application chip set, a camera image processor (CIS), a mobile DRAM, etc. may be further provided to the computing system 5000. The memory system may include a solid state disk (SSD) as a memory for storing data. The memory system may include a fusion flash memory such as an One-NAND flash memory.

The flash memory and/or the memory controller may be packaged using various types of packages such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP), or wafer-level processed stack package (WSP).

Figure 13:
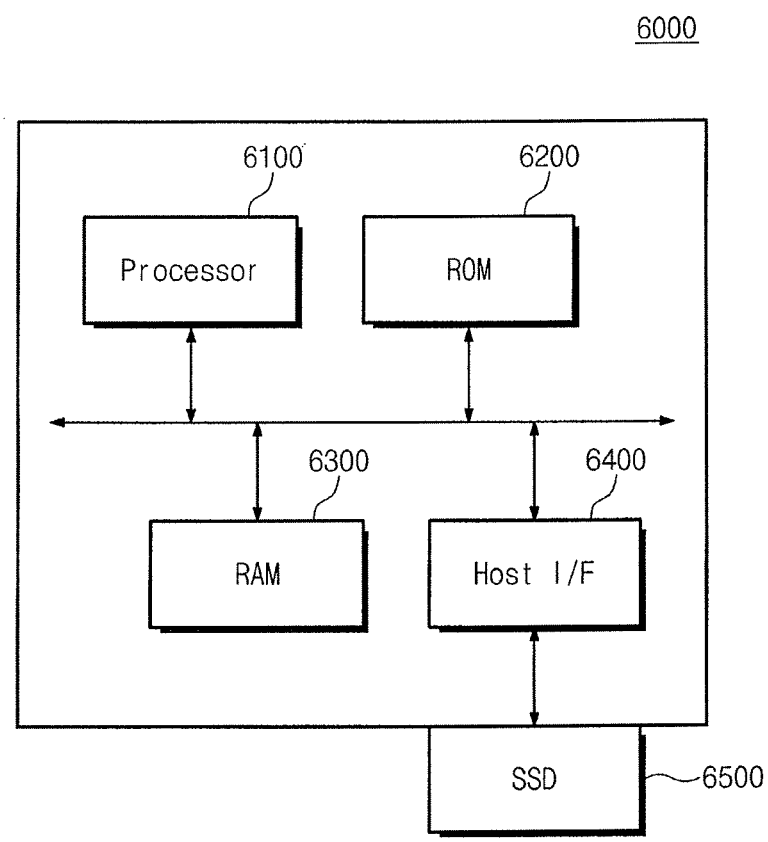
FIG. 13 is a block diagram illustrating an application system including a SSD according to an exemplary embodiment of the inventive concept.

FIG. 13 is a block diagram illustrating an electronic device including the SSD 4000 of FIG. 11 according to an exemplary embodiment.

Referring to FIG. 13, the electronic device 6000 includes a processor 6100, a ROM 6200, a RAM 6300 and a flash interface 6400. The electronic device 6000 may include a SSD 6500. Alternatively, the SSD 6500 may be externally coupled to the electronic device 6000.

The processor 6100 may access the RAM 6300 to execute a firmware code or an arbitrary code. The processor 6100 may access the ROM 6200 to execute a command sequence such as a beginning command sequence or a basic input/output operation system sequence. The flash interface 6400 may serve as an interface between the electronic device 6000 and the SSD 6500. As shown in FIG. 13, the SSD 6500 may be attached to or detached from the electronic device 6000. The SSD 6500 may include substantially the same SSD as the SSD 4000 of FIG. 11.

The buffer memory described with reference to FIGS. 3 to 8 may be included in the SSD 6500. In the case that the buffer memory stores more map information, a map hit ratio increases. Since the memory space of the buffer memory is dynamically allocated according to a read operation mode including the sequential read mode or the random read mode, the buffer memory having a limited memory space may be efficiently used and thus the performance of the electronic device 6000 is increased.

The electronic device 6000 may include a cellular phone, a personal digital assistant (PDA), a digital camera, a camcorder, or a mobile audio player (e.g., MP3).

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A method of operating a semiconductor storage device including a nonvolatile memory and a controller including a buffer memory, the buffer memory including a data area and a map area, the method comprising:
   determining whether a read operation mode of the nonvolatile memory is a sequential read operation or a random read operation;
   allocating a part of the map area as the data area of the buffer memory upon determining that the read operation mode is the sequential read operation and allocating a part of data area as the map area of the buffer memory upon determining that the read operation mode is the random read operation; and
   performing the read operation mode to read out user data and map data from the nonvolatile memory and storing the user data and the map data in the data area of the buffer memory and the map area of the buffer memory, respectively.

2. The method of claim 1, further comprising:
allocating the data area and the map area of the buffer memory before determining whether a read mode is a sequential read operation or a random read operation.

3. The method of claim 1, further comprising:
comparing a size of the user data with a size of the data area to generate a comparison result; and
adjusting a size of the data area and a size of the map area in accordance with the comparison result.

4. The method of claim 3,
wherein adjusting the size of the data area and the size of the map area comprises:
increasing the data area by a first amount and decreasing the map area by a second amount if the size of the user data to be stored in the buffer memory is greater than the size of the data area.

5. The method of claim 1,
wherein the user data are stored in a first storage of the buffer memory, the first storage being a writable free space having lowest address in the buffer memory.

6. The method of claim 1,
wherein the map data are stored in a second storage of the buffer memory, the second storage being a writable free space having highest address in the buffer memory.

7. The method of claim 1,
wherein the map data read from the nonvolatile memory are only part of a whole map data stored in the nonvolatile memory.

8. The method of claim 1,
wherein the data area of the buffer memory increases when the user data read from the nonvolatile memory has a first size and is stored in a first address space of the nonvolatile memory and the map data has a second size and is stored in a second address space of the nonvolatile memory, and
wherein the first size is larger than the second size and the first address space is smaller than the second address space.

9. The method of claim 1,
wherein a boundary between the data area of the buffer memory and the map area of the buffer memory is shifted depending on whether the read operation mode is the sequential read operation or the random read operation.

10. The method of claim 4,
wherein the first amount is equal to the second amount.

11. A semiconductor storage device comprising:
a nonvolatile memory; and
a memory controller including a buffer memory being coupled to the nonvolatile memory, the buffer memory including data area and map area, and the memory controller configured to read user data and map data from the nonvolatile memory and to store the user data and the map data in the data area and the map area respectively in accordance with a read operation mode,
wherein a size of the data area and a size of the map area are adjusted depending on whether the read operation mode is a sequential read operation or a random read operation.

12. The semiconductor storage device of claim 11,
wherein the size of the data area is increased when the read operation mode is a sequential read operation and the size of the map area is increased when the read operation mode is a random read operation.

13. The semiconductor storage device of claim 11,
wherein the memory controller is configured to generate a comparison result by comparing the size of the user data with the size of the data area and to adjust the size of the data area and the size of the map area according to the comparison result.

14. The semiconductor storage device of claim 13, wherein the buffer memory is to perform a cache memory operation and to increase the size of the map area for enhancing hit ratio of the cache memory operation.

15. The semiconductor storage device of claim 11, wherein the semiconductor storage device is a embedded multi-media card (eMMC).

16. A memory controller for operating a nonvolatile memory, comprising:
 a buffer memory having a memory space comprising a data area and a map area; and
 a buffer memory controller coupled to the nonvolatile memory and configured to adjust a size of the data area and a size of the map area according to a read operation mode,
 wherein the size of the data area is increased if the read operation mode is a sequential read operation and the size of the map area is increased if the read operation mode is a random read operation.

17. The memory controller of claim 16, wherein if the size of the data area is increased by a first amount, the size of the map area is decreased by a second amount, and
 wherein if the size of the data area is decreased the size of the map area is increased by a fourth amount if the size of the data area is decreased.

18. The memory controller of claim 17, wherein the first amount increased in the data area is equal to the second amount decreased in the map area.

19. The memory controller of claim 16, wherein the buffer memory is a static random access memory (SRAM).

\* \* \* \* \*